United States Patent
Shang et al.

(10) Patent No.: US 11,403,209 B2
(45) Date of Patent: Aug. 2, 2022

(54) RENDERING GUI TEST OBJECT OF APPLICATION UNDER TEST TO REFLECT TEST INFORMATION

(71) Applicant: MICRO FOCUS LLC, Santa Clara, CA (US)

(72) Inventors: Er-Xin Shang, Shanghai (CN); Bin Zhou, Shanghai (CN); Bin Gao, Shanghai (CN); Bin Li, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 91 days.

(21) Appl. No.: 16/803,069

(22) Filed: Feb. 27, 2020

(65) Prior Publication Data
US 2021/0271588 A1      Sep. 2, 2021

(51) Int. Cl.
*G06F 11/36* (2006.01)

(52) U.S. Cl.
CPC ...... *G06F 11/3664* (2013.01); *G06F 11/3676* (2013.01); *G06F 11/3684* (2013.01); *G06F 11/3688* (2013.01); *G06F 11/3692* (2013.01)

(58) Field of Classification Search
CPC ............. G06F 11/3684; G06F 11/3664; G06F 11/3676; G06F 11/3692; G06F 11/3688
See application file for complete search history.

(56) References Cited

U.S. PATENT DOCUMENTS

| | | | |
|---|---|---|---|
| 8,549,478 B2 | 10/2013 | Amichai et al. | |
| 9,098,632 B2 | 8/2015 | Cook | |
| 9,679,090 B1 | 6/2017 | Marolia | |
| 2008/0010537 A1* | 1/2008 | Hayutin | G06F 11/3664 714/38.14 |
| 2009/0199096 A1* | 8/2009 | Pop-Jordanov | G06F 11/3692 715/704 |
| 2009/0217302 A1* | 8/2009 | Grechanik | G06F 11/368 719/320 |
| 2014/0101640 A1* | 4/2014 | Romdhane | G06F 11/3684 717/125 |
| 2016/0299837 A1* | 10/2016 | Browne | G06F 11/3692 |
| 2017/0270034 A1* | 9/2017 | Cai | G06F 8/38 |
| 2018/0067842 A1* | 3/2018 | Kochura | G06F 11/3676 |

FOREIGN PATENT DOCUMENTS

CN          102495789 B      1/2015

OTHER PUBLICATIONS

Android Developer Fundamentals Course-Practical Workbook, Google Developer Training Team, Dec. 2016.
Jiang, H. et al., "Comparison of Different Techniques of Web GUI-based Testing with the Representative Tools Selenium and EyeSel" M.S. in Software Engineering Jun. 2017.
"How to do UI Testing with Selenium", OutSystems, Mar. 30, 2017, <https://success.outsystems.com/Documentation/Development_FAQs/How_to_do_UI_testing_with_Selenium>.

* cited by examiner

*Primary Examiner* — Wei Y Zhen
*Assistant Examiner* — Amir Soltanzadeh

(57) ABSTRACT

A graphical user interface (GUI) of an application under test (AUT) is rendered. A GUI test object of the AUT is identified within the GUI. Test information regarding the GUI test object of the AUT is retrieved. The GUI test object of the AUT is rendered within the GUI to reflect the test information.

20 Claims, 7 Drawing Sheets

RENDERING GUI TEST OBJECT OF APPLICATION UNDER TEST TO REFLECT TEST INFORMATION

BACKGROUND

Computing devices like desktops, laptops, and other types of computers, as well as mobile computing devices like smartphones, among other types of computing devices, run software, which can be referred to as applications, to perform intended functionality. An application may be a so-called native application that runs on a computing device directly, or may a web application or "app" at least partially run on remote a computing device accessible over a network, such as via a web browser running on a local computing device. To ensure that an application has been developed correctly to perform its intended functionality and that the application is operating correctly, the application may be tested.

DETAILED DESCRIPTION

Figure 1:
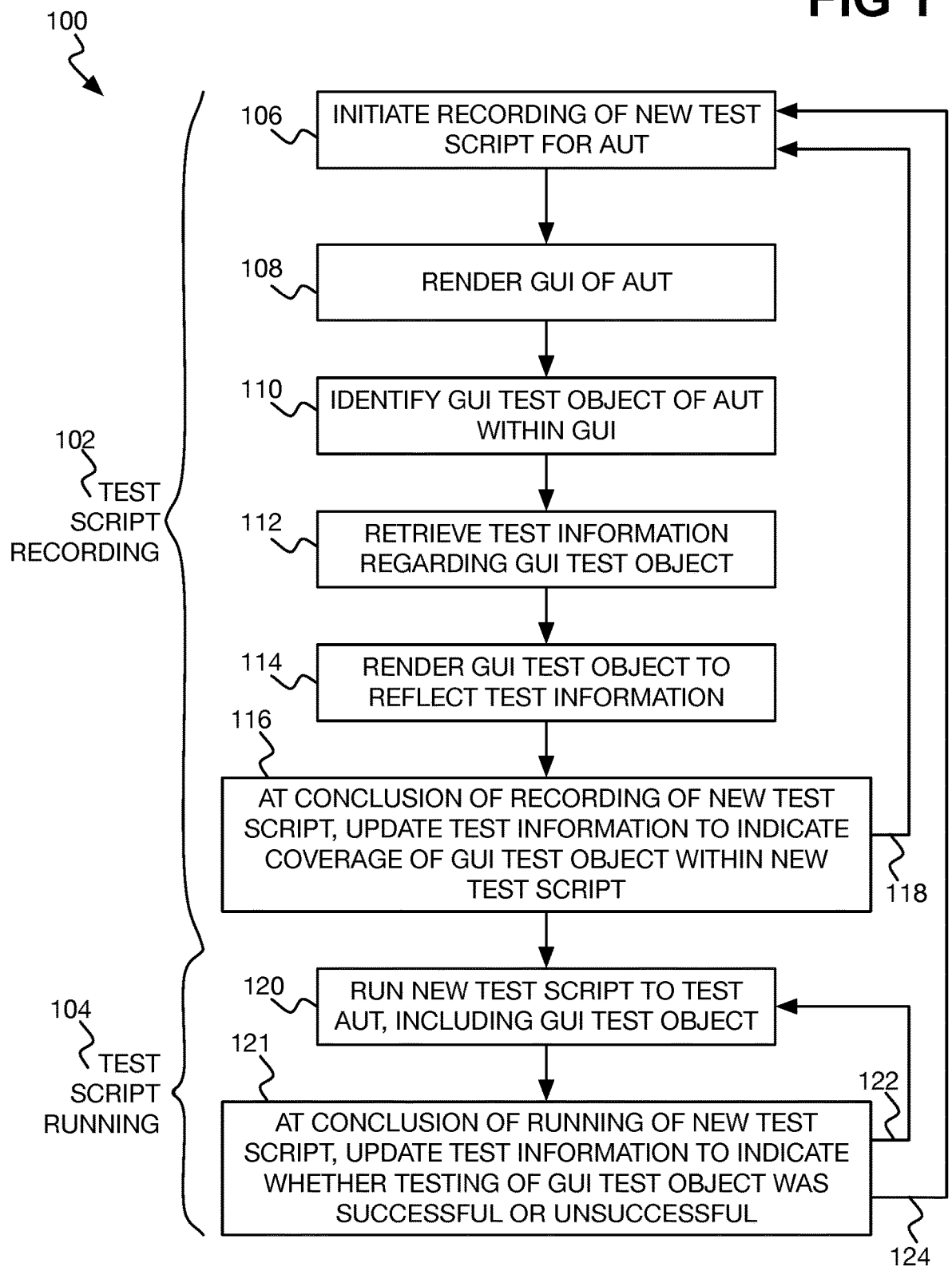
FIG. 1 is a flowchart of an example method for recording and running a test script for an application under test (AUT), including rendering a graphical user interface (GUI) test object of the AUT within a GUI of the AUT to reflect test information regarding the GUI test object.

As noted in the background, an application is a computer program that is run, or executed, to perform intended functionality, and which may be tested to ensure that the application performs its intended functionality correctly. An application being tested may be referred to as an application under test (AUT). An AUT may expose a graphical user interface (GUI) that includes GUI test objects, such as check boxes, buttons, text boxes, and other types of GUI elements. During testing, the GUI test objects are actuated, or selected, in a defined sequence to verify that the application operates as expected.

Specifically, a tester may record a test script in which he or she selects GUI test objects within the GUI of an AUT in a defined sequence. A test script thus specifies a selection sequence of specific GUI test objects to test the AUT. Once recorded, the test script may be run, or executed, in an automated manner a number of times to determine whether the application performs its intended functionality as expected. Each GUI test object covered, or included, within a test script is thus tested during subsequent running of the test script. The testing of each GUI test object may be successful or unsuccessful, in correspondence with whether selection of the GUI during running of the test script results in the application operating as expected.

To ensure that an AUT is adequately tested, each GUI test object should be well represented within the recorded test scripts for the AUT. Similarly, to the extent that the testing of the GUI test objects was unsuccessful in prior running of the test scripts, such GUI test objects may warrant extra attention in newly recorded test scripts to verify that any intervening revision of the AUT resolved the issues precluding the GUI test objects from previously operating as expected. When a tester records a new test script for the AUT, he or she should thus be aware of which GUI test objects have little to no coverage in existing test scripts for the AUT, and which GUI test objects were unsuccessfully tested during running of the existing test scripts.

It can be difficult for a tester to reference such test information regarding the GUI test objects of an AUT when recording a new test script for the AUT. The tester may have to locate existing test scripts, and determine whether each GUI test object is adequately covered by the existing test scripts. The tester may similarly have to locate test results generated when the existing test scripts were run, and determine whether testing of each test object was successful or unsuccessful during running of the existing test scripts. To save time when choosing which GUI test objects to select during recording of a new test script for the AUT, the tester may instead rely on his or her memory, leaving some GUI test objects inadequately tested.

Techniques described herein ameliorate these and other difficulties. When recording of a new test script for an AUT is initiated, a GUI test object may be rendered within the GUI of the AUT in a way in which test information regarding the GUI test object is reflected. The GUI test object may be rendered to reflect the extent to which the GUI test object is covered by existing test scripts for the AUT. The GUI test object may additionally or alternatively be rendered to reflect the extent to which testing of the GUI test object during running of the existing test scripts was successful or unsuccessful.

Therefore, when a tester is viewing the displayed GUI of the AUT during recording of a new test script for the AUT, and is deciding which GUI test objects to select for inclusion within the new test script, he or she can quickly assess the GUI test objects that warrant selection. That is, the tester can quickly assess which GUI test objects are inadequately covered in the existing test scripts, and which GUI test objects were unsuccessfully tested during running of the existing test scripts. The tester does not have to review the existing scripts or the prior test results generated when the existing test scripts were run to make this assessment.

The techniques described herein therefore improve the functionality of a computing system. For instance, the techniques improve the application development process by novelly rendering GUI test objects within a GUI of an AUT to reflect test information regarding the GUI test objects. The rendering of the GUI test objects is part and parcel of the techniques described herein. That is, the GUI test objects are specifically rendered to reflect the test information regarding them, including the extent to which the GUI test objects are covered within existing test scripts and the extent to which testing of the GUI test objects was successful during running of the existing test scripts.

FIG. 1 shows an example method 100 for recording and subsequently running a test script for an AUT. The method 100 can be implemented as program code stored on a non-transitory computer-readable data storage medium and executable by a computing device. The computing device may be that of a tester and on which the AUT is run, such as in the case of a native AUT that locally runs on the computing device. The computing device may be a server or other computing device that interacts with the tester's computing device, such as in the case in which the AUT is a web AUT accessible by the computing device of the tester via a web browser. The AUT in this case may run on its own application server or other computing device, in communication with the computing device performing the method 100 and the computing device of the tester.

The method 100 is divided into two sections: test script recording (102) and test script running (104). The recording of the test script and the running of the test script may also be performed by different computing devices or computing systems. For instance, once the test script has been recorded, such as via one or more computing devices as described in the previous paragraph, the test script can then be run using the same or different computing devices. In the latter case, there may be test servers or other computing devices that are dedicated to running the recorded test script. The method 100 can be performed in other ways as well.

The method 100 includes initiating recording of a new test script for the AUT (106). Responsive to such initiation of and during recording of the new test script, the method 100 includes rendering the GUI of the AUT for display (108). The GUI may be displayed on the tester's computing device. The GUI can be a window or screen of the AUT in the case of a native AUT. The GUI can be a web page accessible at a network address like a universal resource locator (URL) address in the case of a web AUT. The GUI includes GUI elements, which are referred to as GUI test objects herein, and which are selected or actuated during running of the AUT to cause the AUT to perform intended functionality. Therefore, during test script recording, the GUI test objects are selected in a recorded ordered, and are then "played back" during subsequent running of the test script.

The method 100 includes identifying a GUI test object of the AUT within the GUI (110). The method 100 is described in relation to one GUI test object, but can be performed with respect to each GUI test object of the AUT. In this respect, the GUI test objects that the GUI of the AUT includes may be determined prior to or as part of identifying each such GUI test object of the AUT. The method 100 includes then retrieving the test information regarding the identified GUI test object (112). The test information can include the coverage of the GUI test object within existing test scripts, and/or whether testing of the GUI test object was successful or unsuccessful when the existing test scripts were run. Whether testing of the GUI test object was successful or unsuccessful encompasses the degree to which the testing was successful or unsuccessful.

As to the coverage of the GUI test object within the existing test scripts, the test information can include the number of existing test scripts including the GUI test object, as well as the identity of each existing test script including the GUI test object and the total number of existing test scripts that have been recorded for the AUT. As to the testing of the GUI test object during running of the existing test scripts, the test information can include whether testing of the GUI test object was successful or unsuccessful each time an existing test script including the GUI test object was run. For each such time an existing test script including the GUI test object was run, the test information can further include the identity of the existing test script.

The method 100 includes rendering the GUI test object within the GUI of the AUT to reflect the retrieved test information regarding the GUI test object (114). Particular graphical ways by which the GUI test object can be rendered in this respect are described later in the detailed description. The GUI test object can be rendered within the GUI to reflect the extent to which the GUI test object is covered by the existing test scripts. For instance, the GUI test object can be rendered to reflect the number of existing test scripts including the GUI test object, or the percentage of existing test scripts for the AUT that include the GUI test object.

The GUI test object can be rendered within the GUI to reflect the extent to which testing of the GUI test object was successful or unsuccessful during running of the existing test scripts. For instance, the GUI test object can be rendered to reflect the number of times that testing of the GUI test object succeeded (or failed) during running of the existing test scripts. As another example, the GUI test object can be rendered to reflect the percentage of times that testing of the GUI test object succeeded (or failed) during running of the existing test scripts.

The tester thus has the benefit of the test information regarding the GUI test object as he or she records the new test script for the AUT. That is, the tester does not have to retrieve, locate, or determine this test information him or herself. As part of recording the new test script for the AUT, the tester already has to view the displayed GUI of the AUT after that GUI has been rendered. Therefore, the test information regarding the GUI test object is visible to the tester within the GUI the tester already has to view during test script recording, due to the rendering of the GUI test object within the GUI to reflect this test information.

At conclusion of recording of the new test script for the AUT, once the tester has completed recording the new test script, the method 100 includes updating the test information regarding the GUI test object to indicate coverage of the GUI test object within the new test script (116). For instance, if the tester selected the GUI test object in question while recording the new test script, the test information can be dynamically updated to reflect that the GUI test object is covered by (i.e., included in) the new test script, and may be updated to identify the new test script as well. If the tester did not select the GUI test object while recording the new test script, the test information may still be updated to reflect that the new test script was recorded, but does not cover the GUI test object.

Once the new test script for the AUT has been recorded, the test script recording process (102) of the method 100 may be repeated for recording another new test script by proceeding back to part 106 (118). The new test script can also or instead be run to test the AUT, including testing of the GUI test object that for the remainder of description of the method 100 is assumed to be covered by the new test script, as part of the test script running process of the method 100 (104). That is, the method 100 can proceed with running the new test script to test the AUT, including testing of the GUI test object (120).

Running the new test script for the AUT involves "playing back" the GUI test objects in the order in which they were selected during recording of the new test script. For each GUI test object identified in the new test script, the GUI test object is selected, and the behavior of the AUT is analyzed to determine whether it operated as to be expected responsive to selection of the GUI test object. If the AUT does perform as expected, the next GUI test object is selected. If the AUT does not perform as expected, the next GUI test object indicated in the new test script is still selected if possible, and if not, then the remainder of the GUI test objects within the new test script may not be performed. In the latter case, such GUI test objects may not be considered as having been tested during the running of the new test script.

When the new test script is run, therefore, testing of the GUI test object in particular may be successful or unsuccessful. If the AUT performs as expected—i.e., it operates correctly—when the GUI test object is selected during running of the new test script, then testing of the GUI test object during running of the new test script is considered successful. Testing of the GUI test object may be considered successful even if testing of the other GUI test objects of the AUT and/or testing of the AUT as a whole is unsuccessful. If the AUT does not perform as expected when the GUI test object is selected, then testing of the GUI test object during running of the new test script is considered unsuccessful.

At the conclusion of running of the new test script for the AUT, the method 100 includes updating the test information for the GUI test object to indicate whether testing of the GUI test object was successful or unsuccessful (121). The test information may also be updated to indicate the identity of the new test script that was run. Once the new test script for the AUT has been run, the test script running process (104) may be repeated to run the new test script another time by proceeding back to part 120 (122). A different new test script can also or instead be recorded by repeating the test script recording process (102), in which case the method 100 proceeds back to part 106 (124).

Figure 2:
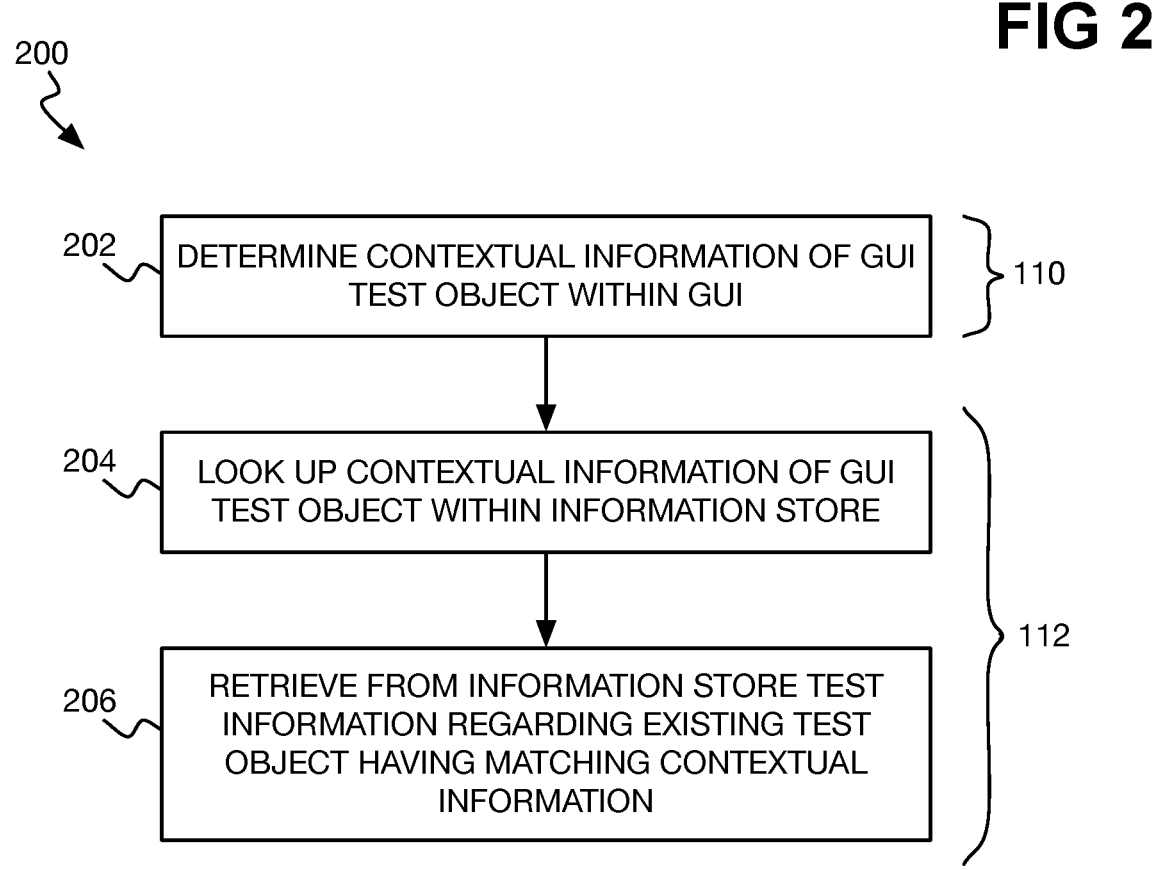
FIG. 2 is a flowchart of an example method for identifying a GUI test object of an AUT and retrieving test information regarding the GUI test object.

FIG. 2 shows an example method 200 for identifying a GUI test object of an AUT within the GUI of the AUT and for retrieving test information regarding the identified GUI test object. The method 200 can therefore be performed to implement parts 110 and 112 of the method 100. Like the method 100, the method 200 can be implemented as program code stored on a non-transitory computer-readable data storage medium and executable by a computing device.

The method 200 includes determining the contextual information of the GUI test object within the GUI of the AUT (202). The contextual information can be determined after the GUI of the AUT has been rendered, or after the GUI has been rendered and displayed. The contextual information identifies the GUI test object within the GUI of the AUT, so that the test information regarding the GUI test object can be retrieved.

The contextual information can include definitional information of the GUI test object of the AUT within the GUI. For example, such definitional information may include the relative location, by x and y coordinates or in another manner, at which the GUI test object appears within the rendered GUI. The definitional information may include a captured image of the GUI test object in addition to or in lieu of its relative location within the GUI. The definitional information may additionally or alternatively include the size of the GUI test object, such as in pixels or in another manner, within the rendered GUI.

The contextual information can also or instead include a captured image of the GUI of the AUT itself. The contextual information can further or instead include window class element information of the GUI of the AUT, particularly in the case of a native AUT that runs on a tester's computing device during test script recording and that runs on a test computing device during test script running. The window class element information may include information in a markup language, for instance, that defines or specifies the window in which the GUI appears.

The contextual information can additionally or instead include a network address, such as a URL, at which the GUI of the AUT is accessible on a network. Such contextual information can be useful in the case of a remote AUT like a web application, for instance, that runs on an application computing device, for instance, and that is accessible via a web browser of a tester's computing device during test script recording or of a test computing device during test script running. The contextual information can include other or additional information, besides the information described herein, by which the GUI test object is identifiable within the GUI of the AUT, to distinguish the GUI test object of the AUT from the same or different GUI test objects of the same or different AUTs.

The method 200 includes then looking up the determined contextual information of the GUI test object within an information store (204). The information store may be database residing on a storage device, for instance, and stores for each of a number of existing GUI test objects contextual information and test information. The GUI test objects are existing GUI test objects in that contextual information and test information for them are currently stored—i.e., exist—within the information store.

The method 200 includes retrieving from the information store the test information regarding the existing GUI test object having contextual information that matches the determined contextual information of the GUI test object of the AUT (206). If no existing GUI test object has matching contextual information, then this can mean that no test scripts have been recorded that cover the GUI test object of the AUT, which in turn means that the AUT and thus the GUI test object of the AUT has not yet been tested. In such instance, there is no test information available for the GUI test object of the AUT for retrieval.

Figure 3A:
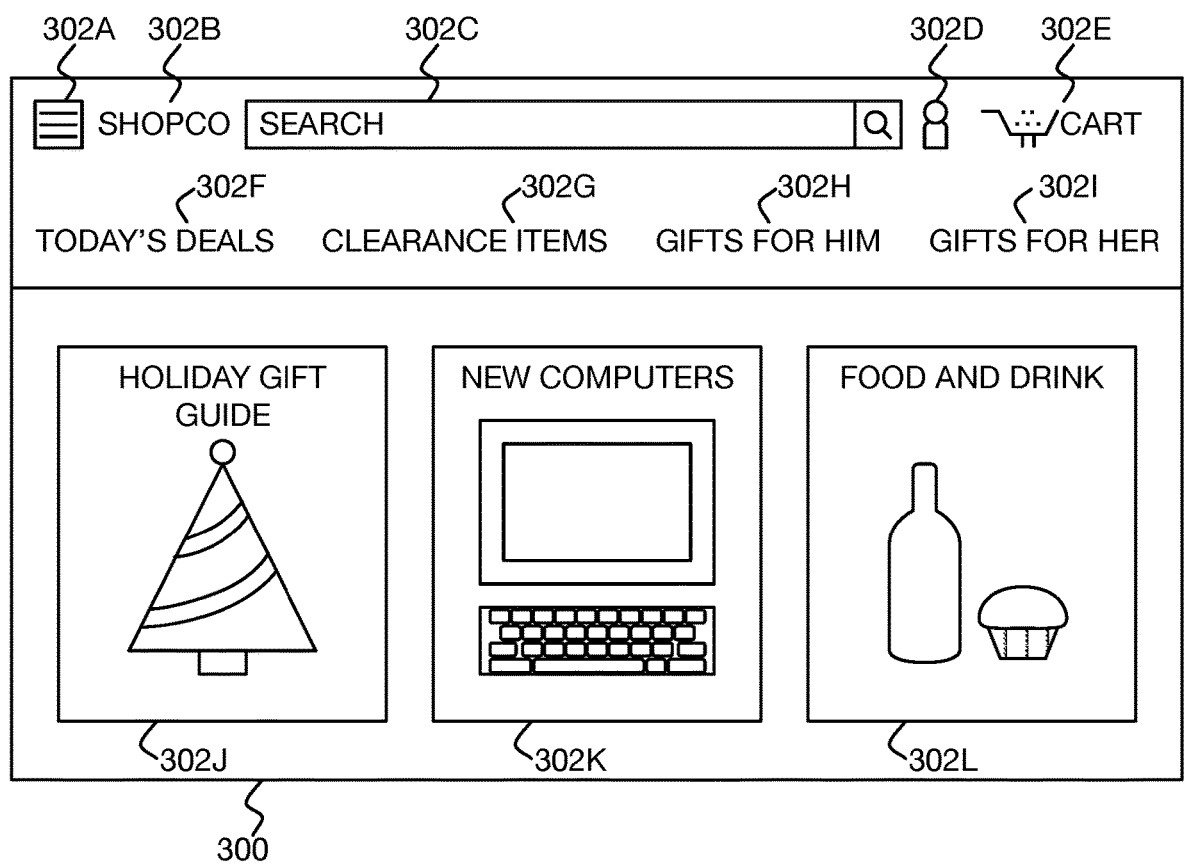
FIGS. 3A, 3B, and 3C are diagrams depicting example renderings of GUI test objects within a GUI of an AUT to reflect test information regarding the GUI test objects.
Figure 3B:
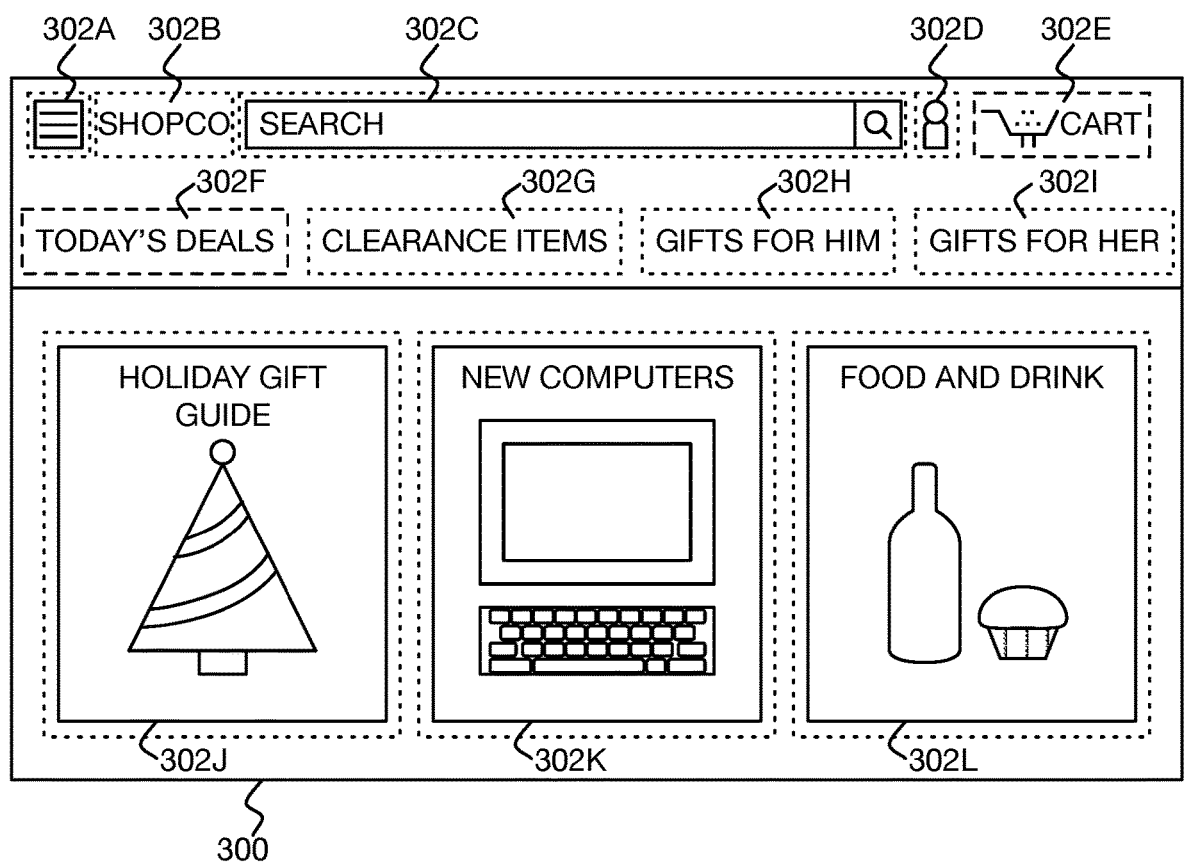
Figure 3C:
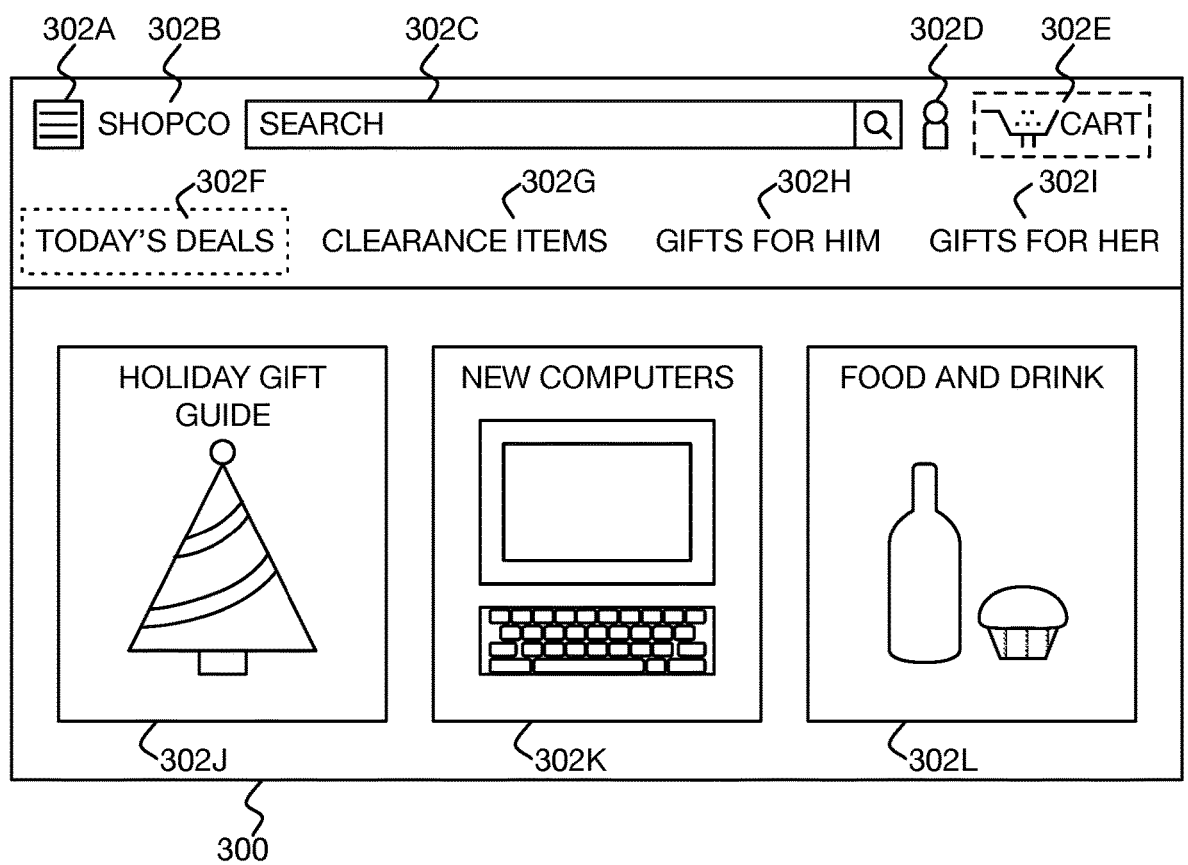

FIGS. 3A, 3B, and 3C depict example rendering of GUI test objects of an AUT within a GUI of the AUT to reflect test information regarding the GUI test objects. FIG. 3A shows a baseline of a GUI 300 of an AUT, such as before any test script for the AUT has been recorded and subsequently run. The GUI 300 includes GUI test objects 302A, 302B, 302C, 302D, 302E, 302F, 302G, 302H, 302I, 302J, 302K, and 302L, which are collectively referred to as the GUI test objects 302 of the AUT. In the example, the GUI 300 may be the GUI of a web application, specifically an electronic commerce ("e-commerce") web site, which is accessible at a network address using a web browser.

FIG. 3B shows the GUI 300 of the AUT once one or more test scripts for the AUT have been recorded. FIG. 3B specifically shows an example rendering of the GUI test objects 302 of the AUT to indicate an extent to which existing test scripts for the AUT cover the GUI test objects 302. In the example, each GUI test object 302 that is covered by any existing test script has been surrounded by a dotted border. Each GUI test object 302 that is not covered by any existing test script has been surrounded by a dashed border. As such, when recording a new test script, a tester can easily assess which GUI test objects 302 are already covered by existing test scripts, and which are not.

The GUI test objects 302 can be rendered to indicate their coverage within existing test scripts for the AUT in other ways as well. Just the GUI test objects 302 that are included—or just those that are not included—in existing test scripts may have surrounding borders. The borders may be of different colors, sizes, and/or shapes, to differentiate GUI test objects 302 that are covered by existing test scripts from those that are not. The GUI test objects 302 may be highlighted in different colors or patterns, instead of being surrounded by borders. The GUI test objects 302 may be so highlighted with color gradients, intensities, animations (e.g., the object changes colors over time to indicate a critical failure), and/or the like, corresponding to the number, criticality, percentage, and/or the like, of the existing test scripts in which they appear.

FIG. 3C shows the GUI 300 of the AUT once one or more test scripts for the AUT have been recorded and subsequently run. FIG. 3C specifically shows an example rendering of the GUI test objects 302 of the AUT to indicate an extent to which testing of the GUI test objects 302 during running of existing test scripts for the AUT was successful or unsuccessful. In the example, the GUI test object 302E is indicated by a dashed border to indicate that its testing during running of the existing test scripts was successful, and the GUI test object 302F is indicated by a dotted border to indicate that its testing was unsuccessful. The other GUI test objects 302 are not surrounded by borders, which indicates that they have not yet been tested. When recording a new test script, a tester thus can easily assess the GUI test objects 302 that have been successfully and unsuccessfully tested.

The GUI test objects 302 can be rendered to indicate whether their testing was successful or unsuccessful during running of existing test scripts for the AUT in other ways as well. The borders may be of different colors to differentiate GUI test objects 302 that have been successfully tested from those that have not. The GUI test objects 302 may be highlighted in different colors or patterns, instead of being surrounded by borders. The GUI test objects 302 may be highlighted with color gradients or intensities in correspondence with the number or percentage of times in which they succeeded (or failed) during running of the existing test scripts. The GUI test objects 302 can further be rendered to indicate both the extent to which they are covered within the existing test scripts and the extent to which their testing was successful during running of the existing test scripts. Furthermore, the GUI test objects 302 may be selectable, such as by right-clicking on the objects 302, hovering a pointer over them, and so on, for more in-depth or other test information to be displayed. Such additional test information can include the testing history of such a selected GUI test object 302, as one example.

Figure 4:
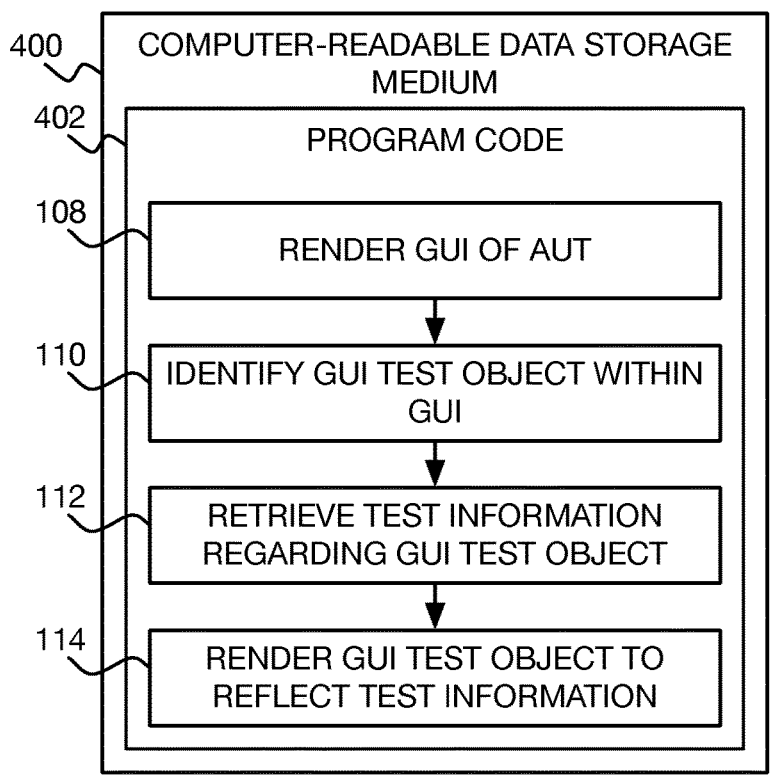
FIG. 4 is a diagram of an example non-transitory computer-readable data storage medium.

FIG. 4 shows an example non-transitory computer-readable data storage medium 400. The computer-readable data storage medium 400 stores program code 402 executable by a computing device to perform processing. The processing includes rendering a GUI of an AUT for display (108), and identifying a GUI test object within the GUI (110). The processing includes retrieving test information regarding the GUI test object of the AUT (112), and rendering the GUI test object of the AUT within the GUI to reflect the test information (114).

Figure 5:
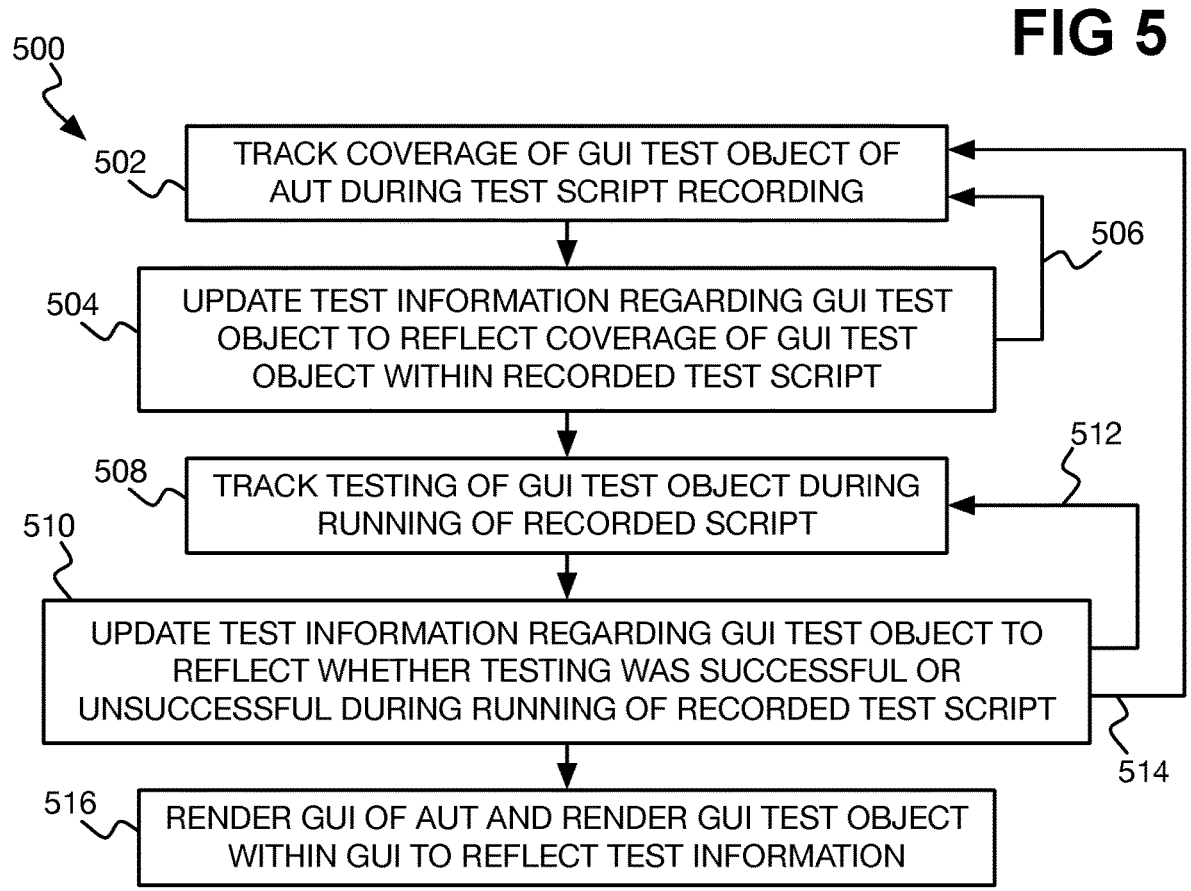
FIG. 5 is a flowchart of an example method.

FIG. 5 shows an example method 500. The method 500 includes tracking coverage of a GUI test object of an AUT during test script recording (502), and updating the test information regarding the GUI test object to reflect the coverage of the GUI test object of the AUT within the recorded test script (504). For instance, the information store that has been described can be updated to store contextual information for the GUI test object along with an indication that the GUI test object is covered within the recorded test script. The method 500 may be repeated at part 502 when another test script for the AUT is recorded (506).

The method 500 includes tracking testing of the GUI test object of the AUT during running of the recorded test script (508), and updating the test information regarding the GUI test object to reflect whether the testing of the GUI test object of the AUT was successful or unsuccessful during running of the recorded test script (510). For instance, the information store can be updated to store whether testing of the GUI test object was successful or unsuccessful. Contextual information of the GUI test object and an indication that the recorded test script covers the GUI test object may have already been stored in the information store.

The method 500 may be repeated at part 508 when the recorded test script is run again (512), or may be repeated at part 502 when another test script for the AUT is recorded (514). The method 500 can include rendering a GUI of the AUT for display, and rendering the GUI test object of the AUT within the GUI to reflect the test information updated in parts 504 and/or 510 (516). For instance, the GUI may be rendered and the GUI test object rendered within the GUI when another test script for the AUT is being recorded.

Figure 6:
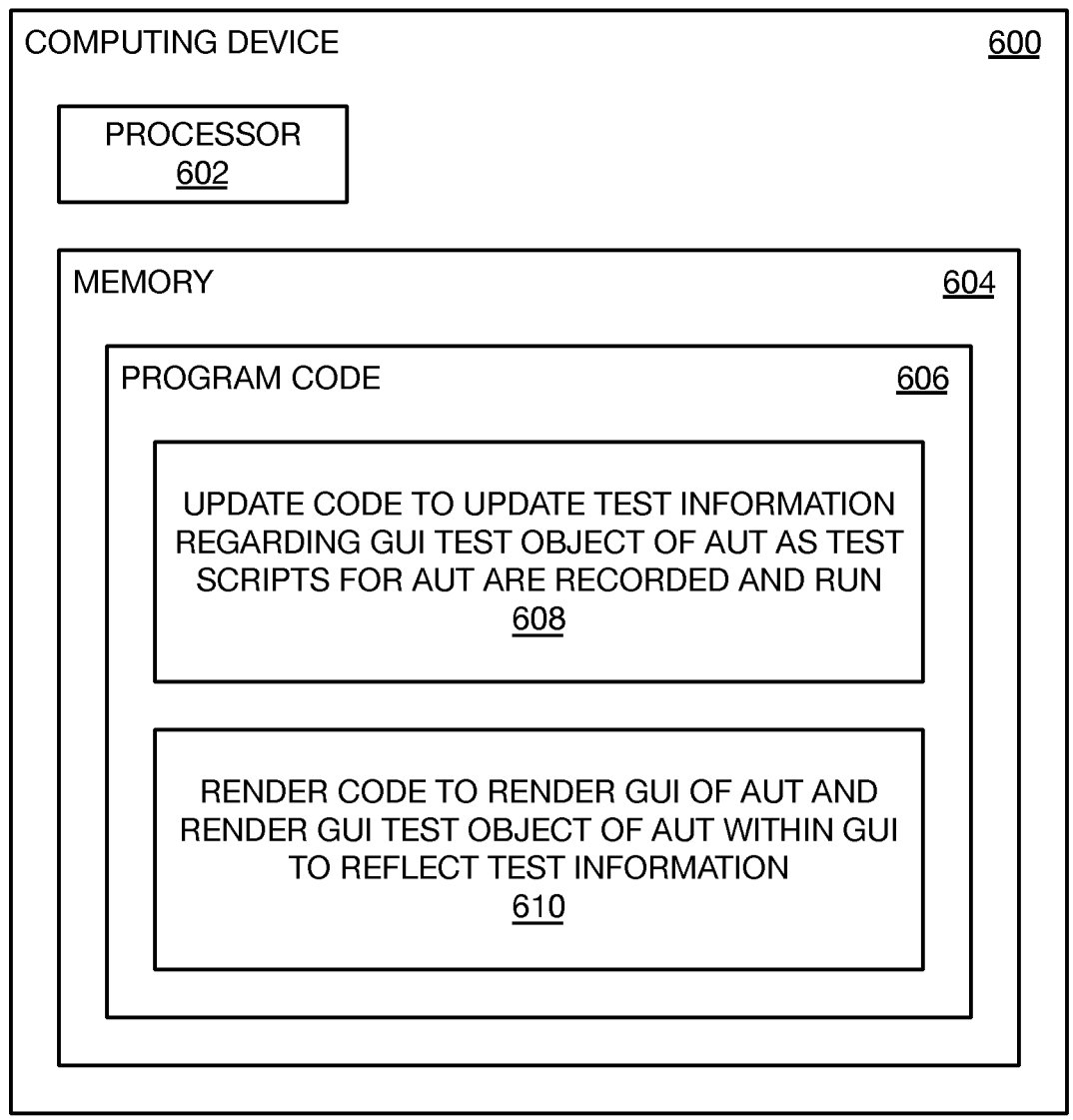
FIG. 6 is a diagram of an example computing device.

FIG. 6 shows an example computing device 600. The computing device 600 includes a processor 602 and a memory 604. The memory 604 stores program code 606 executable by the processor 602. The program code 606 includes update code 608 to update test information regarding a GUI test object of an AUT as test scripts for the AUT are generated and run. The program code 606 includes render code 610 to render a GUI of the AUT and to render the GUI test object of the AUT within the GUI to reflect the test information.

Techniques have been described by which GUI test objects of an AUT can be rendered within a GUI of the AUT to reflect their test information. The test information regarding each GUI test object is thus visible to a tester within the GUI that the tester already has to view during test script recording. As such, the tester can when recording a new test script for the AUT easily assess whether existing test scripts for the AUT already cover the GUI test objects, and/or whether testing of the GUI test objects was successful or not during running of the existing test scripts.

We claim:

1. A non-transitory computer-readable data storage medium storing program code executable by a computing device to perform processing comprising:
   initiating recording of a new test script for an application under test (AUT); and
   in response to initiating recording of the new test script:
      rendering a graphical user interface (GUI) of the AUT for display;
      identifying a GUI test object of the AUT within the GUI, by determining contextual information of the GUI test object of the AUT within the GUI, the contextual information identifying the GUI test object within the GUI of the AUT to permit retrieval of test information regarding the GUI test object;
      retrieving the test information regarding the GUI test object of the AUT; and
      rendering the GUI test object of the AUT within the GUI to reflect the test information to indicate either or both an extent to which the GUI test object of the AUT is covered within existing test scripts for the AUT and an extent to which testing of the GUI test object was successful during running of the existing test scripts for the AUT,
   wherein the GUI test object of the AUT reflects the test information while the new test script is recorded.

2. The non-transitory computer-readable data storage medium of claim 1, further comprising:
   responsive to coverage of the GUI test object of the AUT within the new test script, correspondingly updating the test information to indicate the coverage of the GUI test object of the AUT within the new test script, and correspondingly rendered the GUI test object of the AUT within the GUI to reflect the test information as updated, before the new test script is run to test the AUT.

3. The non-transitory computer-readable data storage medium of claim 1, further comprising:
   upon running the new test script to test the AUT, including the GUI test object of the AUT, updating the test information to indicate whether testing of the GUI test object of the AUT was successful or unsuccessful during running of the new test script.

4. The non-transitory computer-readable data storage medium of claim 1, wherein retrieving the test information regarding the GUI test object of the AUT comprises:
looking up the contextual information of the GUI test object of the AUT against contextual information of a plurality of existing GUI test objects within an information store,
wherein for each existing GUI test object, the information store stores the contextual information of the existing GUI test object and test information regarding the existing GUI test object.

5. The non-transitory computer-readable data storage medium of claim 4, wherein retrieving the test information regarding the GUI test object of the AUT further comprises:
retrieving the test information regarding the existing GUI test object having the contextual information matching the contextual information of the GUI test object of the AUT.

6. The non-transitory computer-readable data storage medium of claim 1, wherein the contextual information of the GUI test object of the AUT comprises a captured image of the GUI of the AUT within which the GUI test object of the AUT is located.

7. The non-transitory computer-readable data storage medium of claim 1, wherein the GUI test object of the AUT is rendered within the GUI to reflect the test information to indicate at least the extent to which the GUI test object of the AUT is covered within the existing test scripts for the AUT.

8. The non-transitory computer-readable data storage medium of claim 1, wherein the GUI test object of the AUT is rendered within the GUI to reflect the test information to indicate at least the extent to which testing of the GUI test object was successful during running of existing test scripts for the AUT.

9. A method comprising:
tracking coverage of a graphical user interface (GUI) test object of an application under test (AUT) within a first test script for the AUT;
tracking testing of the GUI test object of the AUT during running of the first test script;
updating test information regarding the GUI test object to reflect either or both of:
the coverage of the GUI test object of the AUT within the first test script;
whether the testing of the GUI test object of the AUT was successful or unsuccessful during running of the first test script;
initiating recording of a new, second test script for the AUT;
in response to initiating recording of the new, second test script:
rendering a GUI of the AUT for display;
identifying the GUI test object of the AUT within the GUI, by determining contextual information of the GUI test object of the AUT within the GUI, the contextual information identifying the GUI test object within the GUI of the AUT to permit retrieval of the test information regarding the GUI test object;
retrieving the test information upon identifying the GUI test object of the AUT within the GUI; and
rendering the GUI test object of the AUT within the GUI to reflect the test information, wherein the GUI test object of the AUT reflects the test information while the new, second test script is recorded.

10. The method of claim 9, wherein retrieving the test information regarding the GUI test object of the AUT comprises:
looking up the contextual information of the GUI test object of the AUT against contextual information of a plurality of existing GUI test objects within an information store,
wherein for each existing GUI test object, the information store stores the contextual information of the existing GUI test object and test information regarding the existing GUI test object.

11. The method of claim 10, wherein retrieving the test information regarding the GUI test object of the AUT further comprises:
retrieving the test information regarding the existing GUI test object having the contextual information matching the contextual information of the GUI test object of the AUT.

12. The method of claim 9, wherein the contextual information of the GUI test object of the AUT comprises a captured image of the GUI of the AUT within which the GUI test object of the AUT is located.

13. A computing device comprising:
a processor; and
a memory storing program code executable by the processor and comprising:
update code to update test information regarding a graphical user interface (GUI) test object of an application under test (AUT) as test scripts for the AUT are generated and run, the test information indicating either or both coverage of the GUI test object of the AUT within the test scripts and whether testing of the GUI test object of the AUT was successful or unsuccessful during running of the test scripts; and
render code to, in response to recording of a new test script being initiated:
render a GUI of the AUT;
identify the GUI test object of the AUT within the GUI, by determining contextual information of the GUI test object of the AUT within the GUI, the contextual information identifying the GUI test object within the GUI of the AUT to permit retrieval of the test information regarding the GUI test object;
retrieve the test information upon identifying the GUI test object of the AUT within the GUI; and
render the GUI test object of the AUT within the GUI to reflect the test information,
wherein the GUI test object of the AUT reflects the test information while the new test script is being recorded.

14. The computing device of claim 13, wherein the test information indicates coverage of the GUI test object of the AUT within the test scripts.

15. The computing device of claim 13, wherein the test information indicates whether testing of the GUI test object of the AUT was successful or unsuccessful during running of the test scripts.

16. The computing device of claim 13, wherein the contextual information comprises a captured image of the GUI of the AUT within which the GUT test object of the AUT is located.

17. The method of claim 9, wherein the GUI test object of the AUT is rendered within the GUI to reflect the test information to indicate at least an extent to which the GUI test object of the AUT is covered within existing test scripts for the AUT.

18. The method of claim 9, wherein the GUI test object of the AUT is rendered within the GUI to reflect the test information to indicate at least an extent to which testing of the GUI test object was successful during running of existing test scripts for the AUT.

19. The computing device of claim 13, wherein the GUI test object of the AUT is rendered within the GUI to reflect the test information to indicate at least an extent to which the GUI test object of the AUT is covered within existing test scripts for the AUT.

20. The computing device of claim 13, wherein the GUI test object of the AUT is rendered within the GUI to reflect the test information to indicate at least an extent to which testing of the GUI test object was successful during running of existing test scripts for the AUT.

* * * * *